Dec. 11, 1923.

H. WAGNER ET AL

VALVE

Filed July 19, 1922

1,476,862

Hans Wagner and Wilhelm Struck
INVENTORS

BY Stefan H. Phillips
ATTORNEY

Patented Dec. 11, 1923.

1,476,862

UNITED STATES PATENT OFFICE.

HANS WAGNER AND WILHELM STRUBE, OF MAGDEBURG, GERMANY, ASSIGNORS TO NATHAN MANUFACTURING COMPANY, OF NEW YORK, N. Y.

VALVE.

Application filed July 19, 1922. Serial No. 575,938.

*To all whom it may concern:*

Be it known that we, HANS WAGNER, a resident of Madgeburg, Herderstrasse 4, and WILHELM STRUBE, a resident of Magdeburg, Freiestrasse 2-5, Germany, citizens of the Republic of Germany, have jointly invented new and useful Improvements in Valves, of which the following is a specification.

Our invention relates to the general class of valves which close or open inlet and outlet passages by means of valve faces moving transversely to the direction of flow of the steam, air or other fluid through such passages.

The objects of our invention are to obtain close and intimate contact between valve faces and their seats, to apply pressure against these faces and to adjust the degree of such pressure. Other objects and results of our invention will appear from the drawings and from the following description.

Efforts have been made to press and maintain valve faces against their seats by mechanical means as well as by hydrostatic pressure of the fluid whose passage is controlled by the valve. Neither of these means has been satisfactory. Mechanical means, such as tapered wedges, springs and levers are objectionable for the following reasons: First, valves with such means are expensive and difficult to manufacture. Second, undesirable strains are generally caused because of uneven expansion and contraction due to temperature changes. Third, undesirable friction and wear render maintenance difficult and costly. Fourth, a sufficiently uniform pressure of the valve faces against their seats cannot be obtained.

The hydrostatic pressure of the fluid can be utilized so as to press the valve faces uniformly on their seats but the amount of such pressure is dependent upon the fluid pressure available and some multiple of such fluid pressure is usually required for satisfactory seating. Further, any lessening of the fluid pressure results in a decrease in the force which causes the desired seating of the valve.

The valves of our invention are simple, efficient, can be manufactured at low cost, do not readily get out of order and are especially free from the objectionable seating features of other valves.

Figure 1:
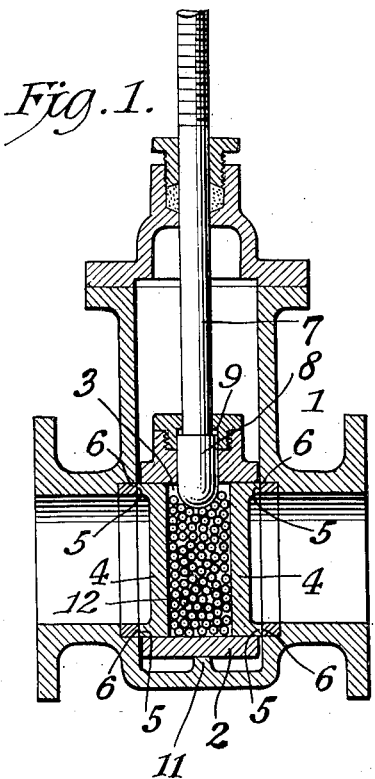
Figure 2:
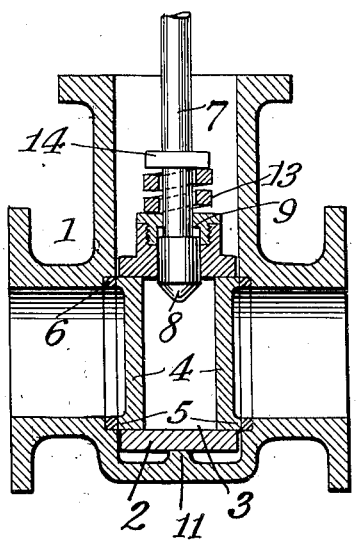
Figure 3:
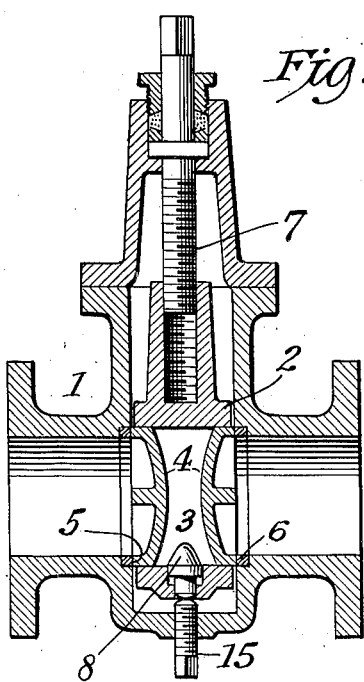
Figure 4:
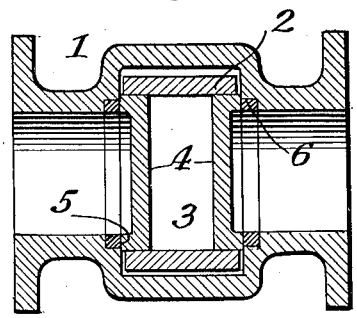

In the accompanying drawings Figures 1, 2 and 3 represent various modifications of our invention, in longitudinal sectional elevation. The same numbers in the different figures designate similar parts. Figure 4 is a transverse sectional view of Fig. 1.

Figure 1 shows a valve with casing 1 and carrier chamber 2 within which is the chamber 3. Piston-like valve discs 4, 4 have faces 5, 5 with seats 6, 6. These disks may be attached to the carrier chamber by inserting them in its walls as shown in Fig. 4. They thus close and open the inlet and outlet passages. Operating spindle 7 has a stub 8 and is slidable within the casing and also within the carrier chamber, stub 8 and shoulder 9 of the carrier chamber limiting the withdrawal of the spindle from the carrier chamber. Hub 11 limits movement of the carrier chamber 2 in the seating of the valve.

The chamber 3 contains solid matter capable of transmitting pressure radially to the direction of the applied pressure. We have found very small, smooth and round balls of non-corrosive steel 12 to be particularly useful. When the chamber is partially or wholly filled with a number of such balls they resemble a fluid in that the pressure of the stub 8 upon them is transmitted substantially without loss to the valve disks 4, 4 and their faces 5, 5, are thereby forced tightly on their seats. The chamber 2 is shown as partially filled with such balls whose sizes, however, as shown, are merely illustrative.

It is obvious that other solid matter besides these balls may be used to accomplish the desired result.

Figure 2 illustrates another form of our invention, there being shown a compression spring 13 around the operating spindle 7 and between the spindle nut 14 and the carrier chamber shoulder 9. The spring 13 tends to press the spindle 7 and its stub 8 against the balls (not shown in this figure) in the chamber 3, the balls transmitting this pressure to the valve discs 4, 4. The pressure of the fluid against the valve faces during their seating may thus be wholly or partially balanced.

Figure 3 illustrates another form of our invention wherein the stub 8 is not mounted on the spindle 7 but in that end of the carrier chamber 2 which is opposite to the spindle. The stub 8 may be supported by bolt 15, both stub and bolt being adjustable so as to position the stub at the desired distance within the chamber. The stub 8 and the bolt 15 may also be unitary in structure, the stub then bearing directly against the casing 1.

The operation of the described valves is as follows: In seating the valve, the operating spindle is moved inward until the valve faces are seated and until the carrier chamber meets the hub 11. The spindle may then be caused to move into the chamber 3 and pressure thus exerted upon the solid matter within the chamber by means of the stub 8. In the case of the valve in Fig. 2, the compression spring tends to aid this seating process by partially or wholly balancing the pressure of the fluid. In opening the valve the spindle is withdrawn, and the carrier chamber with its valve disks is carried with it.

Other embodiments of our invention are obviously possible.

We claim:

1. A valve having a hollow chamber containing mobile, small, hard and tough units resistant to deformation, compression and fracture, and means for applying pressure to such units for the purpose of seating said valve.

2. A valve having a hollow chamber between its faces, said chamber containing mobile and small units resistant to deformation and compression, and means for applying pressure to the valve faces through and by means of said units.

3. A valve which is seated by means of hydrostatic-like pressure applied by solid matter contained within a chamber adjacent to the valve face.

4. A valve having valve faces, a hollow chamber adjacent to such faces and incompressible solid matter acting like a fluid in the transmission of pressure within such chamber and acting as a medium to transmit pressure to the valve faces.

5. A valve having a hollow chamber containing shot, valve discs slidably arranged therein, and a plunger adapted to exert pressure against said shot, said pressure being transmitted by the shot to the discs.

6. A chamber closable by a disc, the disc being movable by pressure exerted by hard and tough units within the chamber and resistant to deformation, compression and fracture, said pressure being produced by the movement of a plunger into the chamber.

HANS WAGNER.
WILHELM STRUBE.